March 6, 1951     W. A. SOURWINE     2,544,400
STRAIN MEASURING INSTRUMENT
Filed Jan. 19, 1944     3 Sheets-Sheet 1
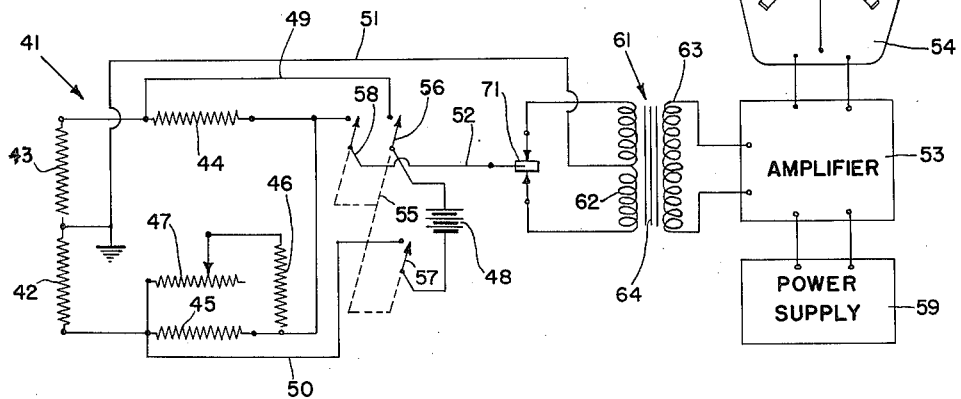
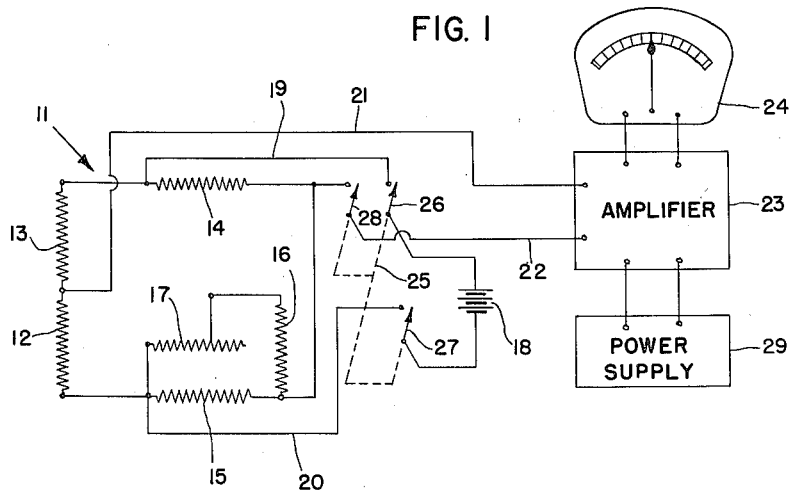
INVENTOR
WILLIAM A. SOURWINE
ATTORNEY March 6, 1951 W. A. SOURWINE 2,544,400
STRAIN MEASURING INSTRUMENT
Filed Jan. 19, 1944 3 Sheets-Sheet 2

INVENTOR.
WILLIAM A. SOURWINE
BY
ATTORNEY

March 6, 1951 W. A. SOURWINE 2,544,400
STRAIN MEASURING INSTRUMENT
Filed Jan. 19, 1944 3 Sheets-Sheet 3

INVENTOR.
WILLIAM A. SOURWINE
BY
ATTORNEY

Patented Mar. 6, 1951

2,544,400

UNITED STATES PATENT OFFICE 2,544,400

STRAIN MEASURING INSTRUMENT

William A. Sourwine, Eggertsville, N. Y., assignor to Curtiss-Wright Corporation, a corporation of Delaware Application January 19, 1944, Serial No. 519,076

3 Claims. (Cl. 73—88.5)

This invention relates to mechanism for electrically measuring and indicating quantities which can be caused to actuate slight variations in electrical resistance. It is particularly applicable to the measurement and indication of structural strains, such as in aircraft, ships, land vehicles, bridges, highways, subways, towers, pressure vessels and tanks, dams, cranes and hoists, machinery, and ordnance, by means of resistance type strain gages.

Commercial strain gages are composed of predetermined lengths of special resistance wire, and are attached to the material in which strain is to be measured. Imposed strain causes the resistance of the wire to change, and this change in resistance is measured by incorporating the gage as one arm of a Wheatstone bridge. A compression strain causes decrease in resistance, while a tension strain causes increase in resistance. In previous practice, it has been customary to balance the bridge before imposing a strain thereon. This method was rather cumbersome, in that it required two separate balancing operations, with calculations of resistance for each balanced condition, and calculation of strain from the change in resistance. The mechanism of the present invention eliminates the necessity for one of these balancing operations, and also eliminates the calculations, the amount of strain being measured directly in micro-inches per inch on a galvanometer or other suitable current measuring device.

Figure 3:
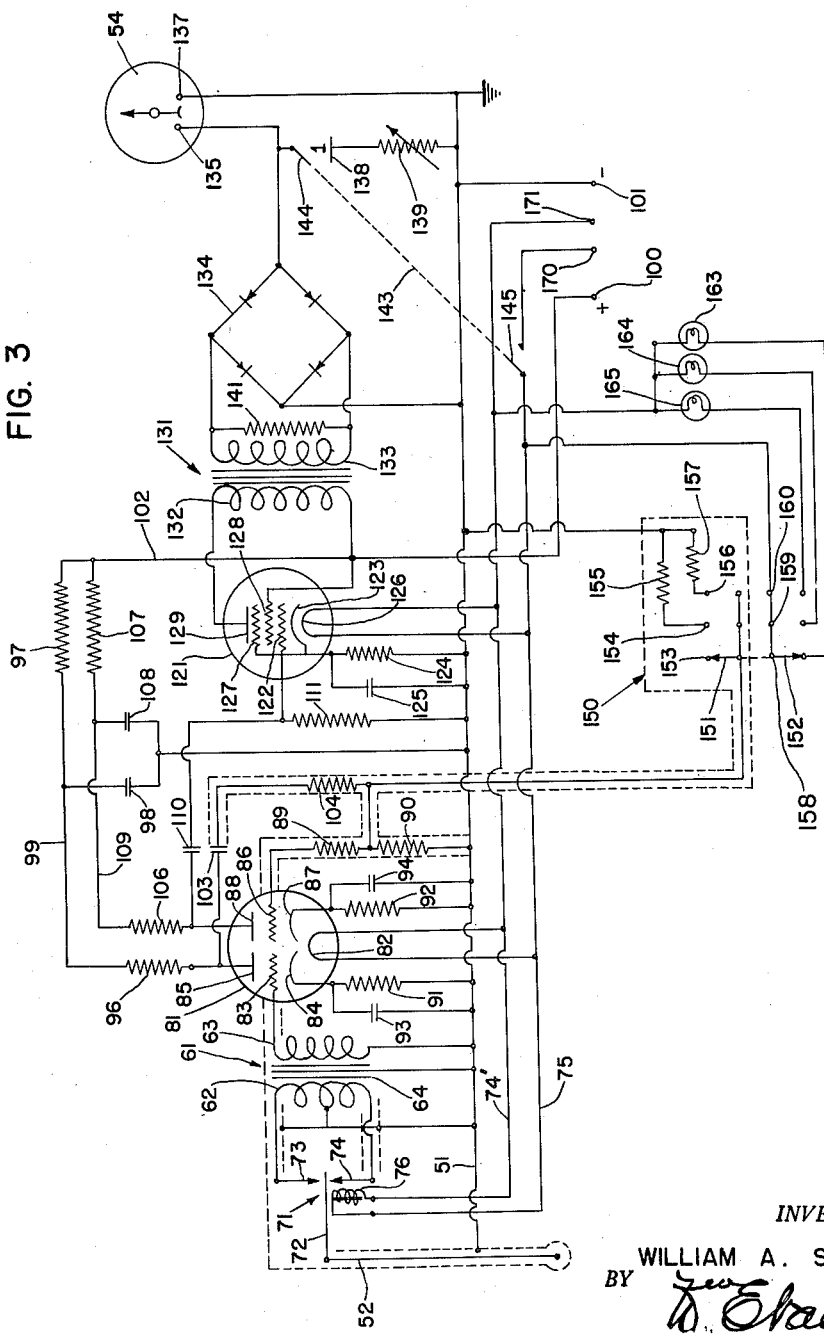
Figure 4:
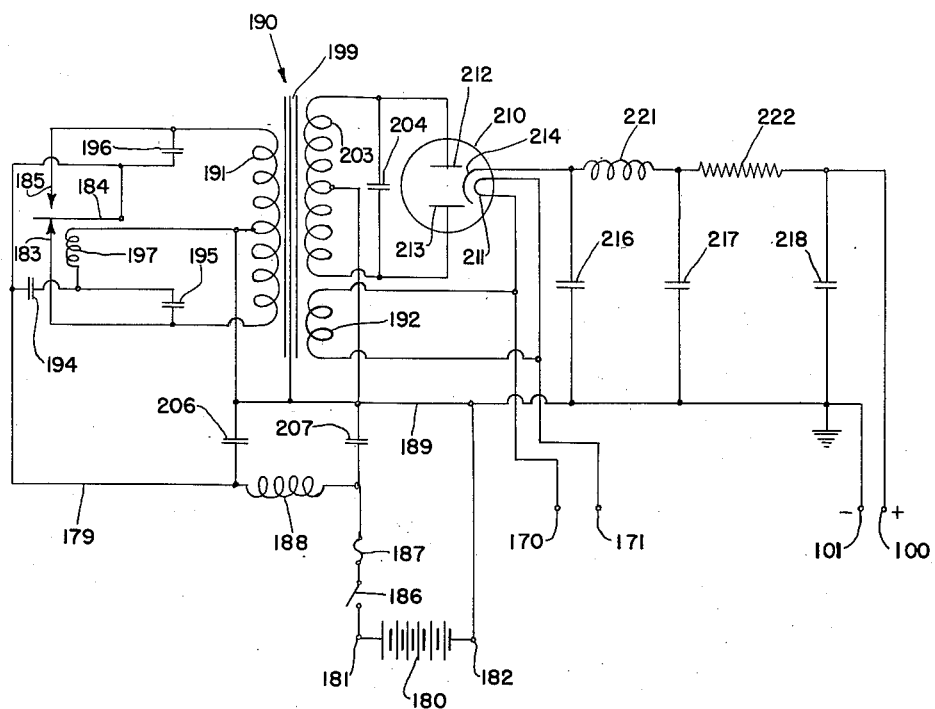

In the drawings, Figure 1 is a general wiring diagram of a simple embodiment of the invention, in which the direct current output of the bridge is supplied by a direct current amplifier, and the resulting amplified current measured on a galvanometer reading directly in micro inches per inch; Figure 2 is a general wiring diagram of another embodiment of the invention, in which the direct current output of the bridge is changed to alternating current, the latter then amplified by an alternating current amplifier and a power supply unit, and the resulting amplified current measured on a galvanometer reading directly in micro inches per inch; Figure 3 is a wiring diagram of a form of alternating current amplifier for use in the circuit shown in Figure 2 together with D. C. to A. C. transformer means for the amplifier input and rectifier means connected to the amplifier output for operating an indicator; and Figure 4 is a wiring diagram of a form of power supply unit for use in the circuit shown in Figure 2.

Referring now to Figure 1, the strain gage 12 or other resistance to be measured in incorporated as one arm of a Wheatstone bridge indicated generally at 11. A temperature compensating or control gage 13 is incorporated as another arm of the bridge 11. The third arm of the bridge is composed of a fixed resistance 14, while the fourth arm is composed of a fixed resistance 15 with an adjusting circuit in parallel thereto, such adjusting circuit being composed of a fixed resistance 16 and a rheostat or variable resistance 17 in series therewith. A battery 18 supplies current to the bridge through the circuits 19 and 20. The current output of the bridge is fed through circuits 21 and 22 to the direct current amplifier, indicated generally at 23, and the amplified current read on the milliammeter indicated generally at 24. A 3-pole switch 25 brings the circuit into operation, and is composed of three contact arms 26, 27, and 28, which operate to close circuits 19, 20, and 22 respectively. The power supply unit 29 furnishes current to the amplifier 23.

Any number of bridges similar to bridge 11 may be used with a single battery-amplifier-power supply-milliammeter set-up. Each bridge would have a separate switch 25 to throw in the battery 18 and one circuit 22 to the amplifier 23. The remaining circuits 21 for all the bridges would be grounded or permanently connected to a common terminal at the amplifier 23.

In the operation of any bridge, the bridge is first balanced at zero strain by manipulation of the rheostat 17, until the milliammeter 24 registers no current. A strain is then imposed upon the element under stress, causing the resistance of gage 12 to change. The current is again read on the milliammeter, which may be calibrated, directly in micro inches per inch. When more than one strain gage is to be read, this is preferably done by first bringing all the bridges into balance at zero strain, imposing strains on all the gages, and then reading the strains on the successive bridges by successively closing the switches 25.

The embodiment of the invention shown in Figure 1, has the objection that the current output from the direct current amplifier 23 increases continuously, or shows a drift, during the warming up period. This obviously lowers the accuracy of the apparatus and also renders the process of reading strains somewhat more laborious, due to the necessity of constantly bringing the bridges into balance at zero strain before each reading is taken. To overcome these difficulties, the apparatus shown in Figure 2 is employed, in which the direct current output from the bridge is transformed into alternating current, and the latter than amplified and measured on a milliammeter as before.

Referring now to Figure 2, the strain gage 42 or other resistance to be measured in incorporated as one arm of a Wheatstone bridge indicated generally at 41. A temperature compensating or control gage 43 is incorporated as another arm of the bridge 41. The third arm of the bridge is composed of a fixed resistance 44, while the fourth arm is composed of a fixed resistance 45 with an adjusting circuit in parallel thereto, such adjusting circuit being composed of a fixed resistance 46 and a rheostat or variable resistance 47 in series therewith. A battery 48 supplies current to the bridge through the circuits 49 and 50. The current output of the bridge is fed through grounded circuit 51 to the midpoint of a coil 62 and through circuit 52 and vibratory reed interrupter 71 to the opposite ends of coil 62. Coil 62 is the primary of a transformer indicated generally at 61. The secondary 63 of transformer 61 is connected to amplifier 53. A power supply unit, indicated generally at 59, furnishes power to the amplifier 53, and the output from the latter is registered on milliammeter 54, reading directly in micro-inches per inch. A 3-pole switch 55 brings the circuit into operation, and is composed of three contact arms 56, 57, and 58, which operate to close circuits 49, 50, and 52 respectively.

A plurality of bridges may be incorporated with one battery-amplifier-power supply milliammeter set-up, as described in connection with Figure 1.

Referring now to Figure 3, the vibratory reed interrupter 71 is composed of a vibrating metallic reed 72 having a natural vibration frequency equal to the desired frequency of the current to be produced. This reed is directly connected to circuit 52. When it is set into vibration it alternately makes contact with contact arms 73 and 74 which are connected to opposite ends of the primary coil 62. The current thus passes through primary coil 62 in alternate directions and thus induces an alternating current in secondary coil 63. The reed 72 is started and kept in continuous vibration by means of a solenoid 76 supplied with alternating current through conductors 74' and 75 and terminals 170 and 171, this circuit being of the same frequency as the natural frequency of the reed 72.

The transformer 61 contains a core 64 which is grounded to the circuit 51. One end of the secondary coil 63 is also grounded to circuit 51, the opposite end being connected to one grid 83 of a twin triode vacuum tube 81. The other grid 86 of the tube 81 is connected to the ground circuit 51 through two resistances 89 and 90. In parallel with resistance 90 there may be interposed another resistance or resistances, as hereinafter described, for the purpose of varying the degree of amplification to be obtained. The two cathodes 84 and 87 of the tube 81 are associated with the grids 83 and 86 respectively, and with the two plates 85 and 88 respectively. Grid 83 thus controls the plate current in plate 85, and grid 86 the plate current in plate 88. The heater 82 of the tube 81 is connected across the alternating current circuits 74' and 75. The two cathodes 84 and 87 are connected to the ground circuit 51 through the resistances 91 and 92 respectively in parallel with condensers 93 and 94 respectively. These resistances provide the necessary grid bias for the tubes and serve to provide a low impedance path for the alternating current.

The plate supply voltage of plate 85, brought from a source of direct current through a circuit 102 (the positive terminal is indicated at 100), is loaded with two series resistances 96 and 97. The negative terminal 101 of the source of direct current is connected to the ground circuit 51. A condenser 98 is connected to the circuit 99 (connecting resistances 96 and 97) and the ground circuit 51, thus serving to reduce to a minimum the alternating component of the plate supply voltage of the plate 85. Likewise the plate supply voltage of plate 88, brought from the same source of direct current through circuit 102, is loaded with two series resistances 106 and 107. A condenser 108 is connected to the circuit 109 (connecting resistances 106 and 107) and the ground circuit 51, thus serving to reduce to a minimum the alternating component of the plate supply voltage of the plate 88.

From well-known principles of vacuum tube operation it is seen that the current through the secondary 63 of the transformer 61 controls the grid supply voltage of the grid 83. The latter in turn controls the plate current of plate 85, the alternating component of which passes through a condenser 103, a resistance 104 and resistance 89, and thus controls the grid voltage of grid 86. Finally, the latter controls the plate supply voltage of the plate 88, the alternating component of which passes through a condenser 110 and thus controls the grid supply voltage of the control grid 122 of a vacuum tube pentode 121, as hereinafter described. A resistance 111 connects this control grid circuit to the ground circuit 51.

In the pentode 121, the cathode 123 is connected to the ground circuit 51 through a resistance 124 and a by-passing condenser 125. The heater 126 is connected across circuits 74' and 75. The suppressor grid 127 is connected to the cathode 122 in well-known fashion, while the screen grid 128 is connected to the positive input terminal 100 through the conductor 102, and to one end of the primary winding 132 of an iron-core transformer 131. The opposite end of the primary winding is connected to the plate 129 of the pentode 121. The secondary winding 133 of the transformer 131 is connected to the input terminals of a selenium rectifier 134, with a shunt resistance 141 connected across such input terminals. The positive output terminal of the rectifier 134 is connected to the ground circuit 51, the latter in turn being connected to one terminal 137 of the milliammeter 54. The negative output terminal of the rectifier 134 is connected to the other terminal 135 of the milliammeter 54. Across the terminals of the galvanometer there is connected a battery 138 and a variable resistance 139 in series with each other. The purpose of this battery and resistance combination is to provide a means for balancing the amplifier output to secure a zero reading on the galvanometer at zero strain of the specimen under test. One deck 144 of a switch 143 is also located in the battery circuit. The other deck 145 of the switch 143 is contained in the circuit 75.

By reference to the above description and drawings of the circuits of Figure 3, it will be seen that the apparatus therein depicted is a 3-stage alternating current amplifier, with resistance-capacitance coupling between the first two stages and transformer output coupling from the third stage.

The degree of amplification obtained (according to the magnitude of the imposed strain) can be adjusted by means of the range control apparatus indicated generally at 150. This operates to introduce a by-passing resistance around the resistance 90, thereby decreasing the signal voltage applied to the grid 86. The range control apparatus consists basically of two contact arms 151 and 152 respectively which are mechanically but not electrically connected together and thus operated in unison. In the position shown in Figure 3, contact arm 151 is connected to terminal 153, which is electrically isolated. Thus there is no resistance shunting or by-passing resistance 90. When the arm 151 is moved to the right, it comes into contact with terminal 154, thus bringing into the circuit a resistance 155 which is in parallel with resistance 90. When the arm 151 is moved still farther to the right, it comes into contact with terminal 156, thus bringing into the circuit a resistance 157 which is in parallel with resistance 90.

Contact arm 152 also has three positions, in which it contacts terminals 158, 159, and 160 respectively, corresponding to similar positions for contact arm 151. Contact with these respective terminals brings into operation signal lights 163, 164, and 165 respectively. Thus when resistance 90 alone is in circuit, signal light 163 is in operation; when resistance 155 is in parallel with resistance 90, signal light 164 is in operation; and when resistance 157 is in parallel with resistance 90, signal light 165 is in operation.

The dotted lines in Figure 3 (except for the dotted lines connecting contact arms 151 and 152 and also the two decks of switch 143) show the position of shields for protecting certain circuits from the effects of stray currents.

The operation of the Wheatstone bridge and amplifier apparatus, shown in Figures 2 and 3 may be described as follows. The strain gage 42, together with the compensating arm 43, is incorporated in one of the bridges 41, and the rheostat 47 adjusted so that the bridge is in as closely balanced a condition as it is possible to predict in advance. With the switch 151 in the position shown in Figure 3 and the entire resistance 139 thrown into the circuit and switch 143 closed, the switch 55 corresponding to the particular bridge in use is cautiously closed. Since the alternating current amplifier is unable to distinguish between a positive and a negative bridge output potential, the bridge is put into unbalance by adjusting the resistance 47 until the galvanometer deflection of galvanometer 54 is a preselected amount. With this condition, an increase of resistance in the arm 42 (corresponding to a tension load) will cause the galvanometer needle to deflect in one direction, while a decrease of resistance in the arm 42 (corresponding to a compression load) will cause the galvanometer needle to deflect in the opposite direction.

After the bridge is thus put into a preselected unbalance by adjustment of resistance 47, the amplifier output is balanced by adjusting resistance 139 until the galvanometer needle is at the zero point. A strain is then put on resistance 42, and the amount of strain read directly in microinches per inch on the galvanometer scale.

Referring now to Figure 4, this indicates generally the power supply unit which is used to supply power to the amplifier indicated in Figure 3. The power supply unit is supplied with a suitable source of direct current, such as a battery 180. The terminals for attachment of this source are indicated at 181 and 182, being the positive and negative terminals respectively. The negative terminal 182 is connected to the mid-point of the primary winding 191 of a transformer 190, through the grounded conductor 189. The positive terminals 181 is connected through switch 186, fuse 187, choke coil 188 and conductor 179 to a vibrating metallic reed 184 which alternately comes in contact with contact arms 183 and 185 respectively. These two contact arms are connected to opposite ends of the primary winding 191. Thus it is seen that the vibration of reed 184 causes a direct current to pass alternately through each half of winding 191. Condensers 194, 195, and 196 serve to absorb the current as contacts 183 and 185 are alternately opened and closed. The reed 184 is kept in continuous vibration by means of a solenoid 197 which is connected to the mid-point of the coil 191 and also to one end of the coil through condenser 195. Thus part of the current which passes through the lower half of coil 191 will pass through solenoid 197. This will occur, however, only during half a cycle, since current only passes through the lower half of coil 191 during half a cycle. Thus solenoid 197 will attract reed 184 during half a cycle only, and will keep it in its natural period of vibration.

The core 199 of the transformer 190 is grounded to the conductor 189. The transformer contains two secondary windings, one winding 192 furnishing alternating current for the amplifier of Figure 3, through the terminals 170 and 171. Winding 192 also furnishes current for the heater 211 of a vacuum tube rectifier 210. The other winding 203 of transformer 190 is connected at its opposite ends to the two plates 212 and 213 of vacuum tube rectifier 210. Across the terminals of winding 203 is connected a condenser 204. The center point of winding 203 is grounded to the conductor 189.

Two condensers 206 and 207 are connected from conductor 179, on the positive side of battery 180, to the grounded conductor 189, on the negative side of battery 180. These two condensers are connected to opposite sides of the choke coil 188.

The cathode 214 of rectifier tube 210 is connected in series with a choke coil 221 and a resistance 222 to the positive terminal 100 for the direct current output of the power supply unit. The negative terminal 101 for the direct current output is connected directly to the grounded conductor 189 and thence to the negative terminal 182 of battery 180. Fluctuations in the direct current output are smoothed out by means of condensers 216, 217, and 218.

The power supply unit is put into operation by closing switch 186.

The above discussion has been in connection with several specific forms of the invention. It is obvious, however, that many changes may be made in these forms without departing from the spirit of the invention. Accordingly, it is understood that the invention is not to be limited except as defined by the appended claims.

I claim:

1. An apparatus for measuring strains as reflected by small variations in resistance of a strain gage whose resistance is variable in opposite directions from normal in response to strains applied to the gage in opposite directions, said apparatus comprising a Wheatstone bridge having the input terminals thereof arranged for connection to a source of direct current whereby with the bridge balanced in the normal condition of the gage the bridge output current would vary in polarity depending upon the direction of the strains subsequently applied to the gage, means for adjusting the resistance of another arm of the bridge for unbalancing the latter so that the bridge output current will be of the same polarity irrespective of the direction of the strains applied to the gage, means for transforming the bridge output current into an alternating current, the last-mentioned means comprising a transformer and a vibrating reed for reversing the polarity of the current applied to the transformer primary windings at a predetermined frequency, an alternating current amplifier for amplifying the alternating current from the transformer secondary windings, means for rectifying the output current from the amplifier, a galvanometer connected across the output of said rectifying means and biasing means shunting the galvanometer and adjustable to reduce the galvanometer current to zero in the said normal condition of the strain gage, said galvanometer measuring variations in either direction from zero and being calibrated to measure directly the value and direction of strains applied to the gage.

2. An apparatus for measuring strains as reflected by small variations in resistance of a strain gage whose resistance is variable in opposite directions from normal in response to strains applied to the gage in opposite directions, said apparatus comprising a Wheatstone bridge having the input terminals thereof arranged for connection to a source of direct current whereby with the bridge balanced in the normal condition of the gage the bridge output current would vary in polarity depending upon the direction of the strains subsequently applied to the gage, means for adjusting the resistance of another arm of the bridge for unbalancing the latter so that the bridge output current will be of the same polarity irrespective of the direction of the strains applied to the gage, means for transforming the bridge output current into an alternating current, an alternating current amplifier for amplifying the transformed bridge output current, means for rectifying the output current from the amplifier, a galvanometer connected across the output of said rectifying means and biasing means shunting the galvanometer and adjustable to reduce the galvanometer current to zero in the said normal condition of the strain gage, said galvanometer measuring variations in either direction from zero and being calibrated to measure directly the value and direction of strains applied to the gage.

3. An apparatus for measuring strains as reflected by small variations in resistance of a strain gage whose resistance is variable in opposite directions from normal in response to strains applied to the gage in opposite directions, said apparatus comprising a Wheatstone bridge having the input terminals thereof arranged for connection to a source of direct current whereby with the bridge balanced in the normal condition of the gage the bridge output current would vary in polarity depending upon the direction of the strains subsequently applied to the gage, means for adjusting the resistance of another arm of the bridge for unbalancing the latter so that the bridge output current will be of the same polarity irrespective of the direction of the strains applied to the gage, means for transforming the bridge output current into an alternating current, an alternating current amplifier for amplifying the transformed bridge output current, means for rectifying the output current from the amplifier, an electrical indicating instrument connected across the output of said rectifying means and biasing means shunting said instrument and adjustable to reduce the instrument current to zero in the said normal condition of the strain gage, said indicating instrument measuring variations in either direction from zero for determining the value and direction of strains applied to the gage.

WILLIAM A. SOURWINE.

REFERENCES CITED

The following references are of record in the file of this patent:

UNITED STATES PATENTS

| Number | Name | Date |
| --- | --- | --- |
| 1,460,530 | Brown et al. | July 3, 1923 |
| 1,665,397 | Wunsch | Apr. 10, 1928 |
| 1,939,067 | Legg | Dec. 12, 1933 |
| 1,961,965 | Fisher | June 5, 1934 |
| 2,077,833 | Gieringer | Apr. 20, 1937 |
| 2,114,298 | Gunn | Apr. 19, 1938 |
| 2,133,670 | Schuchmann | Oct. 18, 1938 |
| 2,229,009 | Berry | Jan. 14, 1941 |
| 2,329,841 | Keinath | Sept. 21, 1943 |
| 2,339,579 | Milne et al. | Jan. 18, 1944 |
| 2,389,615 | Eder | Nov. 27, 1945 |